United States Patent [19]

Wiegand

[11] Patent Number: 4,891,646

[45] Date of Patent: Jan. 2, 1990

[54] MODULATED SINGLE CHANNEL DIGITAL RADIO FREQUENCY MEMORY (DRFM)

[75] Inventor: Richard J. Wiegand, Severna Park, Md.

[73] Assignee: Westinghouse Electric Corp., Pittsburgh, Pa.

[21] Appl. No.: 290,391

[22] Filed: Dec. 29, 1988

[51] Int. Cl.$^4$ .............................................. G01S 7/38
[52] U.S. Cl. ...................................... 342/15; 369/61; 369/62; 342/14
[58] Field of Search ............................ 242/13, 14, 15; 364/423; 369/61, 62

[56] References Cited

U.S. PATENT DOCUMENTS

| | | | |
|---|---|---|---|
| 3,947,827 | 3/1976 | Dautremont, Jr. et al. | 342/13 |
| 3,991,409 | 11/1976 | Dautremont, Jr. et al. | 342/13 |
| 4,017,856 | 4/1977 | Wiegand . | |
| 4,247,946 | 1/1981 | Mawhinney . | |
| 4,328,496 | 5/1982 | White . | |
| 4,547,727 | 10/1985 | Tsui et al. . | |
| 4,613,863 | 9/1986 | Mitchell . | |
| 4,633,516 | 12/1986 | Tsui . | |
| 4,713,662 | 12/1987 | Wiegand | 342/15 |
| 4,743,905 | 5/1988 | Wiegand | 342/14 |

*Primary Examiner*—Thomas H. Tarcza
*Assistant Examiner*—John B. Sotomayor
*Attorney, Agent, or Firm*—W. G. Sutcliff

[57] ABSTRACT

A modulated single channel (as opposed to a quadrature channel) digital radio frequency memory (DRFM) system retrievably stores incoming radio frequency (RF) signals in a digital memory and replicates the RF signals at the output. The input RF signal to be stored is mixed with a local oscillator (LO) signal modulated with a waveform pattern to produce an intermediate frequency (IF) signal which is digitized and retrievably stored in the digital memory. The stored digital values are later retrieved from memory after the programmed delay time, and converted back to an analog IF signal and mixed with the local oscillator to produce the output RF signal. The LO signal is modulated with the same waveform used to produce the input IF signal. A controller for controlling the modulation of the LO signal and the memory includes a ROM for storing a pseudo random string of one bit words and an address counter to drive the ROM beginning at a starting address upon the occurrence of the input RF signal. A latch memorizes the starting address and resets the address counter to the starting address after the programmed delay for the output RF signal. The ROM output is converted to an analog signal and applied to modulate the local oscillator signal with the same waveform so that the output RF signal is a replica of the input RF signal.

11 Claims, 3 Drawing Sheets

MODULATED SINGLE CHANNEL DIGITAL RADIO FREQUENCY MEMORY (DRFM)

BACKGROUND OF THE INVENTION

This invention relates, in general, to digital electronic memories and, more specifically, to digital radio frequency memories (DRFMs) suitable for use in radar countermeasures equipment.

Active radar jammers are used in the field of electronic countermeasures to confuse or counter a system originating radar signals. In some situations, it is desirable to return signals to the radar system which are exact copies of the arriving radar signal. In other situations, it is desirable to return signals to the radar system which have characteristics other than that of the received radar signal in order to further confuse the radar system. In any event, it is usually necessary for the countermeasure system to store the received radar signal and reproduce it at a later time.

Previously, delay lines of various types have been used to effectively store the received radar signal for a short period of time and make the stored radar signal available at a later time. Typical delay lines, however, have the disadvantage that the delay cannot be electronically changed easily, and it is difficult to obtain reasonably long delay periods without serious signal degradation. An improvement over the delay line technology has been achieved by the use of digital radio frequency memories (DRFMs) which convert relatively high radio frequency (RF) signals down to a lower intermediate frequency (IF) by mixing the RF with a local oscillator (LO) signal for storage into a digital memory device. The digital memory can be controlled in a manner similar to the control of the digital memory of a computer. Stored values representing the radar signal can be recalled and reproduced at any time delay desired. Further, manipulation of the digital values to produce changes in the replicated signal are also conveniently done by digital processes.

U.S. Pat. No. 4,713,662 entitled "Modulated Digital Radio Frequency Memory", which issued Dec. 15, 1987 in the name of Richard J. Wiegand, the inventor herein, and assigned to Westinghouse Electric Corporation, the assignee herein, describes single and dual channel DRFMs. In either system it is necessary to first convert the RF signal down to a lower IF signal which is manageable. The IF signal is digitized by means of an analog-to-digital (A/D) converter at a given sampling rate which is determined by the capacity of the A/D equipment. The digitized signal is then stored in a digital memory. At a later time the digital signal may be called from memory and converted to an analog IF signal by a digital-to-analog (D/A) converter. The IF signal is mixed with the local oscillator (LO) signal to reproduce or convert the IF to the higher RF frequency signal which is a replication of the incoming radar signal.

Although conversion of the incoming radar signal to a lower frequency IF signal allows more realistic A/D and D/A equipment, a consequence of mixing signals of different frequencies is the production of two resulting signals which represent the sum and difference of the original signal. In many situations the sum and the difference signals are easily distinguished. For example, if a 3100 MHz RF signal is mixed with a 3000 MHz LO signal the sum and difference signals produced are 6100 MHz and 100 MHz. These Signals are easily distinguished. Within the DRFM the 6100 MHz signal is ignored and the relatively low 100 MHz signal is digitized and stored in the memory. However, when the 100 MHz signal is recalled from memory and converted up to the RF level by mixing with the 3000 MHz LO signal, the original 3100 MHz RF signal representing the sum is produced as well as a 2900 MHz spurious image signal which represents the difference. The image signal has nominally the same amplitude and is not easily distinguished from the original signal. Thus, it is necessary to suppress the image signal.

The usual method of suppressing the image signal in DRFMs is to employ two channel (quadrature) I&Q memory system described in the above noted Wiegand patent. By using the two channel I&Q system with proper phase shifting techniques the image signal can be eliminated or cancelled at the output. However, I&Q systems have additional components which are expensive and heavy. Also, the two channel system contains a non-performance region, or hole, which occurs when the frequency of the RF signal is close to the frequency of the local oscillator (LO) of the memory system.

According to the well known Nyquist sampling theory, the maximum usable instantaneous bandwidth (IBW) of a memory system is equal to one-half the sampling rate of the A/D and D/A converters used in the DRFM. Having a large instantaneous bandwidth (IBW) is advantageous from the standpoint that it allows radar signals over a wider range to be detected, stored and jammed by the countermeasures equipment. One way to maximize instantaneous bandwidth is to use one bit sampling. An example of one bit sampling is a system which looks at or samples a high frequency signal by registering (storing) the polarity of the signal at each sample point.

One bit sampling also provides the advantages of increased amplitude dynamic range and reduced storage requirements. However, one bit sampling results in a large number of spurious frequencies or unwanted spectral lines (spurs) being produced in the IF signal. The spurs are ultimately reproduced in the RF output signal because of the mixing processes used in the DRFM. Spurs degrade system performance and should be suppressed by some additional means.

According to the prior art prior to Wiegand's invention, the most effective way to obtain reasonably large bandwidths and suppress images was to use the two channel I&Q storage system.

Wiegand's patent describes a single channel DRFM. According to, modulation of the frequency or phase of the LO eliminates one channel. Also, modulation suppresses spurs, and eliminates the hole or nonperformance region. One bit sampling is maintained.

SUMMARY OF THE INVENTION

There is disclosed a modulated single channel digital radio frequency memory (DRFM) for use as a coherent radio frequency memory in a military electronic countermeasure system. The DRFM includes a digital memory, an analog-to-digital A/D converter at the input of the digital memory, a digital-to-analog D/A converter at the output of the digital memory, an input and output mixer with its LO and modulator in the form of a phase waveform generator. The incoming RF signal, is applied to the input mixer along with a local oscillator (LO) signal modulated by the waveform generator according to a waveform pattern governed by an addressable read only memory (ROM) to produce an IF signal for application to the analog-to-digital converter. Digital values from the converter representing the combination of the RF signal and the modulated LO signal are stored in the memory. When the stored digital values are retrieved to reconstruct the incoming RF signal, they are converted to an analog IF signal and passed through a low pass filter before being applied to the output mixer. The local oscillator signal, modulated with an identical waveform produced by the addressable ROM used during the storage of the digital values, is also applied to the output mixer to reproduce the output RF signal from the mixer which is a delayed replication of the input RF signal.

The local oscillator can be frequency modulated directly or its signal can be modulated by phase modulation. The pattern of the LO modulation waveform used during signal storage is reproduced when the signal is to be applied at the output mixer. Although a random modulation waveform is usually preferred because it gives better spur suppression, a psuedo random waveform which repeats periodically is sufficient in most applications for spur and image reduction. Psuedo random waveforms are easier to generate and duplicate than true random waveforms.

In accordance with the present invention, the advantages of a single channel DRFM as set forth in the Wiegand patent are achieved by the present invention. In addition, a relatively simple and straightforward method of generating the modulation waveform pattern and reproducing the pattern at a later time is described herein.

In accordance with the present invention a modulated DRFM is disclosed in which the local oscillator produces a local oscillator signal. A modulating means for modulating the local oscillator signal with a modulating analog waveform containing discrete digital levels in a pattern is provided. A first mixer converts the RF input signal and the modulated local oscillator signal into an intermediate frequency signal representing the RF input. An A/D converter converts the IF signal into digital values in accordance with the occurrence of the RF input signal for later retrieval. After the programmed delay, a first D/A converter converts the retrieved digital values into an analog signal and a first IF filter filters the analog signal. A second mixer converts the filtered analog signal and the modulated local oscillator signal into a demodulated RF output signal. A controller means controls the modulating and memory means such that the pattern of the modulation on the local oscillator signal which is applied to the second mixer when specific digital values are being retrieved and converted from the digital memory means is reproduced identical to the pattern of the modulation which was on the local oscillator signal applied to the first mixer when the digital values were converted and stored in the digital memory means, so that the output of the RF signal resembles the input RF signal in form and duration. The controller means includes a digital read only memory ROM having stored therein an addressably retrievable string of a psuedo randomly arranged sequence of one bit words. Any successive number of such words digitally represents the pattern of the modulating analog waveform to be reproduced. A resettable address counter is coupled to the ROM for addressably calling the sequence of one bit words beginning at any address selectable in accordance with the occurrence of an initial load pulse. The address counter is enabled thereafter to call the sequence during a time interval corresponding to the modulation of the RF input signal in the pattern. The address counter is resettable to the selected address upon the occurrence of a reset pulse occurring after storage of the converted intermediate frequency signal in the digital memory. The address counter is enabled to call the sequence during a subsequent time interval corresponding to the occurrence of the demodulation of the RF output such that the pattern is reproduced identical to the pattern of the modulation originally applied to the local oscillator during data storage.

DESCRIPTION OF THE INVENTION

Figure 1:
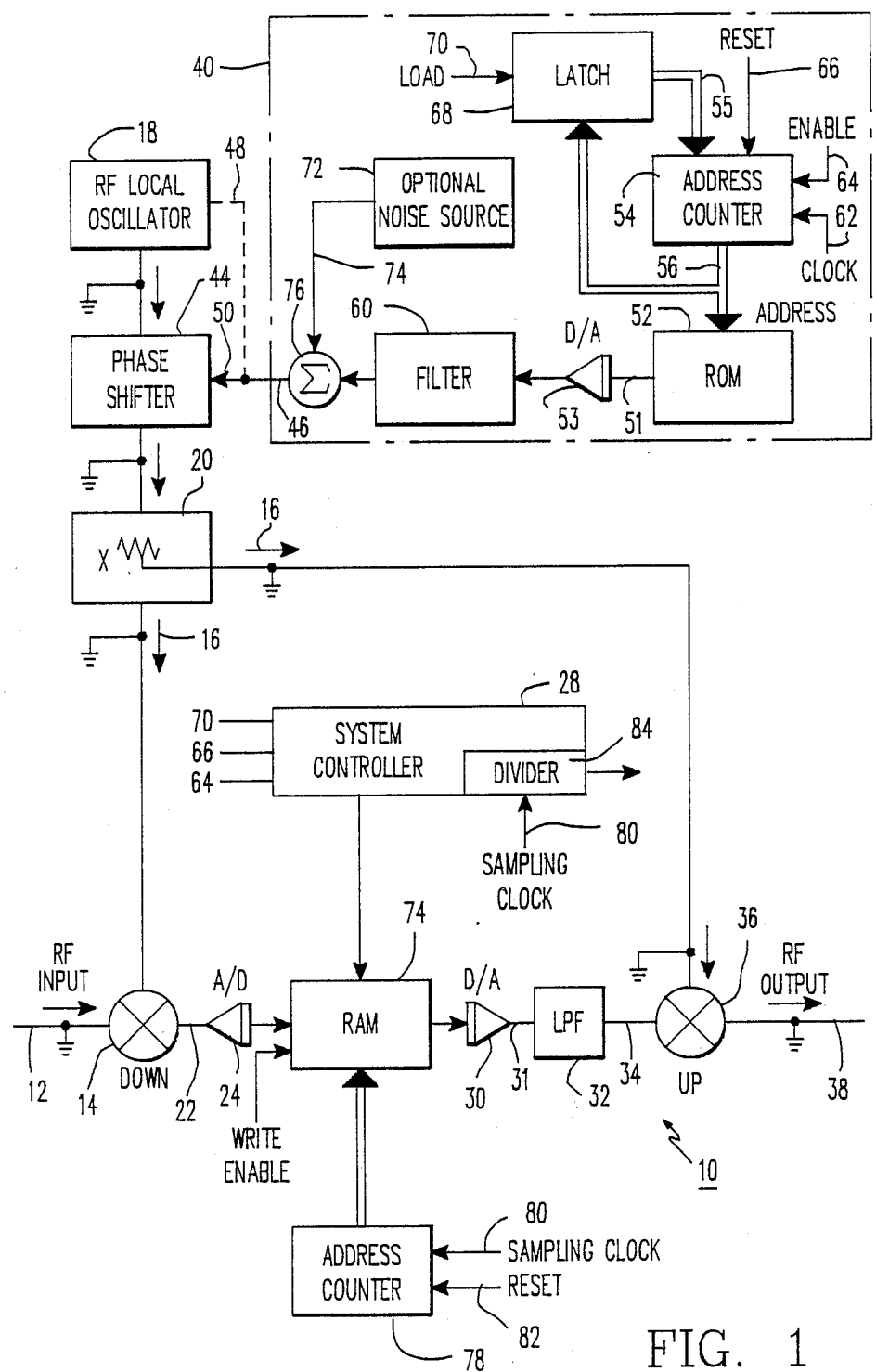
FIG. 1 is a schematic block diagram of a single channel DRFM in accordance with the present invention.

FIG. 1 is a block diagram of a digital radio frequency memory (DRFM) 10 constructed according to a specific embodiment of the invention. According to Fig. 1, the radio frequency (RF) input signal 12 is applied to the mixer or converter 14. A local oscillator (LO) signal 16 originating from the local oscillator 18 is also applied to the mixer 14 after passing through the RF power splitter 20. The result of mixing RF signal 12 and local oscillator signal 16 is an analog intermediate frequency (IF) signal 22 which is applied to the analog-to-digital (A/D) converter 24. The digital values from the converter 24 are stored in the digital random access memory (RAM) 26 and later retrieved, under the control of the system controller 28, and applied to the digital-to-analog (D/A) converter 30. The converter 30 converts the digital values back into an IF signal 31 which is filtered by the optional low pass filter (LPF) 32.

The memory system of FIG. 1 is capable of operating with a bandwidth up to the full sampling rate, or clock or frequency, of the converters 24 and 30. Accordingly, the LPF 32 has a cut-off frequency equal to approximately half the sampling frequency of the digital components used in the system. Therefore, because of the bandwidth foldover this cut-off frequency is twice that of the Nyquist limit normally associated with sampled and digitized signal. That is, this single channel cutoff frequency is the same as used in an I&Q quadrature channel structured DRFM, and so is the RF IBW.

The filtered IF signal 34 is applied to the mixer 36 along with the local oscillator signal 16. Mixing these two signals provides the RF output signal 38 which is a true representation of the input RF signal 12, except for the delay caused by the conversion and storage into the digital memory 26, and any control delay governed by the system controller 28.

In order for the system of FIG. 1 to perform properly, the local oscillator signal 18 must be modulated. A waveform generator 40 is used to develop a desired waveform 46 for the modulation. The modulation waveform 46 is applied either directly to the RF local oscillator 18 as shown by the dash line 48, or to the phase modulator or phase shifter 44 as shown by the solid line 50. When frequency modulating the RF local oscillator 18, the phase shifter 44 would not ordinarily be used. When the waveform generator 40 is used in conjunction with the phase shifter 44 no direct connection is made to the RF local oscillator 18. In any event, either by direct frequency modulation or by phase modulation, the local oscillator signal 16 consists of a modulated signal which is properly modulated for application to the mixers 14 and 36.

The waveform generator 40 is temporarily controlled by the system controller 28, such that, the waveform 46 applied to the phase shifter 44 is the same when the input pulse 12 is applied to mixer 14 as when the output of 34 of the low pass filter 32 is applied to the mixer 36. When the digital data representing the RF input pulse 12 is retrieved from memory 26 to reconstruct the output RF signal 38, the waveform generator 40 is controlled to provide the modulation waveform 46 to the phase shifter 44 which modulates the local oscillator 18 signal to provide the modulated signal 16 for application to the mixer 36. Whether direct frequency modulation is used, or phase modulation, the modulated local oscillator signal 16 has the same modulation waveform 46 applied to it when the output signal 38 is reconstructed from the low pass filter output 34 as when the input signal 12 is converted into digital values and stored in the digital memory 26.

Modulating the waveform 46 according to the preferred embodiment of the invention consists of a pseudo random discrete level digital step wave for ease of reproduction. In the example herein, the step wave changes phase levels a selected number of times during the duration of the input pulse 12. The modulation reduces the spur content in the reconstructed RF 38 output. In accordance with the invention, pseudo random modulation waveform is the preferred embodiment of the invention because it is easier to generate with conventional digital devices. With the pseudo random waveform, a series of pulses in the RF signal are converted by using random waveform modulation. However, after many pulses, the waveform eventually repeats since the device producing the pulses, hereinafter described, has finite storage capacity. For example, a random waveform may be applied to blocks of 100 pulses. However, every block of 100 pulses would have the same waveform applied to its pulses. Nevertheless, according to the invention the nature of the random waveform, even though repeated, is sufficient to reduce the spurs in the output to satisfactory levels.

In accordance with the invention, the pattern of the modulating waveform 46 is generated in the waveform generator 40. The modulating waveform 46 is a waveform in accordance with the bit pattern 51 produced by the read-only-memory (ROM) 52. The bit pattern 51 is first generated at the time the input pulse 12 occurs by calling up a portion or selected number of bits from a relatively long string of pseudo random one bit words stored in ROM 52. For example, ROM 52 may have a string of 1024 one bit words and each word at a corresponding address. If portions of the string are called up in eight bit groups, the ROM has available at least 128 different repeatable patterns. Actually more patterns exist, but for purposes of the disclosure, 128 different patterns is sufficient to approximate the random modulation necessary to decorrelate the spurs.

An address counter 54 coupled to the ROM 52 in the waveform generator 40, produces count output 56 which addressably calls up the words stored in the ROM 52 in bit pattern 51 beginning at the address in ROM 52 corresponding to the count output 56. ROM 52 applies the bit pattern 51 to the converter 58 and filter 60 to produce modulated output 46.

System control 28 produces the various clock reset and latch pulses hereafter described for temporal control. The address counter 54 is driven by a clock pulse 62 and is enabled to produce count output 56 upon the occurrence of enable pulse 64. The address counter 54 may be a free running device running at the clock pulse 62 frequency. The count output 56 of the address counter may be reset to a latch value 55 upon the occurrence of reset pulse 66.

Latch 68 receives the count output 56 of the address counter 54. The latch 68 is responsive to a store or load pulse 70 to store the last count output 56 appearing on the output of the address counter 54. The address counter 54 is inhibited and reset to the same address count stored in latch 68 by reset pulse 66. The address count output 56 appearing at the output of the address counter 54 upon the occurrence of the load pulse 70 and reset pulse 66 is called the starting address.

Figure 2:
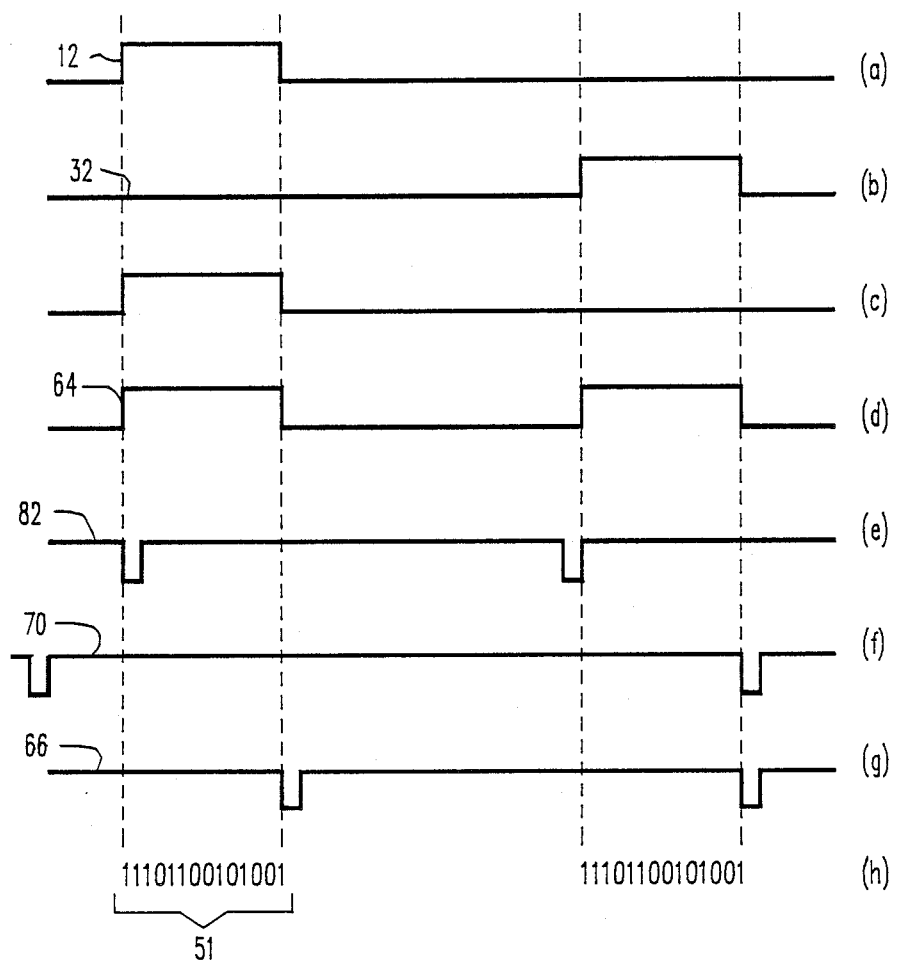
FIG. 2 is a waveform diagram illustrating the timing and sequencing of the circuit described in Fig. 1.

FIG. 2 illustrates the timing of the system. Waveform (a) illustrates the envelope of the incoming RF signal 12. Waveform (b) illustrates the output envelope of the RF output signal 38. Waveform (c) illustrates the configuration of the write enabled signal. Waveform (d) illustrates the waveform of the enable pulse 64. Waveform (e) illustrates the occurrence of the reset number 82. Waveform (f) illustrates the occurrence of the reset or load pulse 70. Waveform (g) represents the occurrence of the reset 66. A typical ROM output or bit pattern 51 is illustrated on line (h). It should be noted that the ROM output occurs during the time of the input RF envelope 12 and the output RF envelope 38 and the bit patterns are identical.

At the trailing edge of the last to occur event, namely reset pulse 70, the address counter 54 is inhibited by the reset pulse 66. At the same time the address count 56 appearing at the output of the address counter 54 is stored in the latch 68 in response to the pulse reset 70. This is the starting address. The address counter 54 is thereafter enabled to begin counting from the starting address upon the occurrence of the enable pulse 64, which is coincidental with and has the same duration as the RF envelope 12. The ROM 52 produces the bit pattern 51 for as long as the address counter 54 is enabled by the pulse 64. The bit pattern 51 is converted by digital-to-analog converter 58 and filter 60 to analog modulation waveform pattern 46 for operating phase shifter 44. As hereinbefore described the modulated local oscillator signal 16 is mixed with the RF input 12 and converted and stored in the RAM 26. The modulation pattern on the local oscillator signal 16 corresponds to the pattern illustrated on line (h) in FIG. 2.

After the full input pulse 12 is stored in the RAM 26, the address counter 54 is inhibited and reset to the starting address stored in the latch 68 in accordance with the reset pulse 66. When it is time to replicate the RF input 12 at the output 38, the address counter 54 is enabled by enable pulse 64. In other words, at the leading edge of the output pulse 38, the address counter 54 is again enabled to count from the starting address supplied by the latch 68. Thus, the pattern is duplicated as illustrated on line (h) of FIG. 2 and the modulation waveform 46 modulates the local oscillator 18 signal thereby creating the modulated LO signal 16 in the same pattern as the RF input was modulated. The same pattern has developed because the address counter 54 drives the ROM 52 from the same starting address for the same time corresponding to the duration of the RF input 12. Thus, the input 12 is exactly duplicated at the output 38.

Upon termination of the enable pulse 64 the address counter 54 is inhibited from producing an output, yet it continues to run. Upon the occurrence of the next load pulse 70 and reset pulse 66, the address counter 54 is inhibited and a new starting address is loaded into the latch 68. Thus, the pattern generated is picked up at some random count of the address counter 54, which accordingly, finds a corresponding address location or address in ROM 52 to produce the bit pattern 51.

The phase change produced by the digitally generated modulation may, for certain particular spurs, be a multiple of 360°. If this special condition occurs the spur may be reinforced as opposed to decorrelated. In order to ensure that all spurs are always relegated to the noise floor, an optional noise source 72 may be provided. The noise source 72 may be in the form of an analog device generating high frequency random noise. The noise source 72 produces a noise signal 74 which is coupled to the output of the filter 60 at the summing junction 76. In this way, the modulating signal 46 has a small noise component which further decorrelates spurs, and especially those spurs that could otherwise have a special mathematical relationship to the digitally generated modulation.

In addition, the AC component provided by the waveform 46 eliminates the hole at the center frequency when the LO signal 16 nominally equals the RF input 12. That is RF inputs 12 at the center of the IBW do not experience attenuation even if the input 12 is AC coupled.

The RAM 26 is driven by an address counter 78 which has a sampling clock input 80. The frequency of the sampling clock 80 may be a relatively high frequency, since it equals the IBW of the DRFM. The address counter 78 is reset by reset pulse 82 shown in FIG. 2, line e. Reset pulse 82 corresponds to the occurrence of the leading edge of RF input envelope 12 and the RF output envelope 38 so that the RAM 26 stores the digital pulses and then retrieves the digital pulses from the proper portion of the memory. The sampling clock signal may be divided by divider 84 to provide clock pulses for the address counter 54 which runs at a slower rate than the sampling clock 80 of the system.

Figure 3:
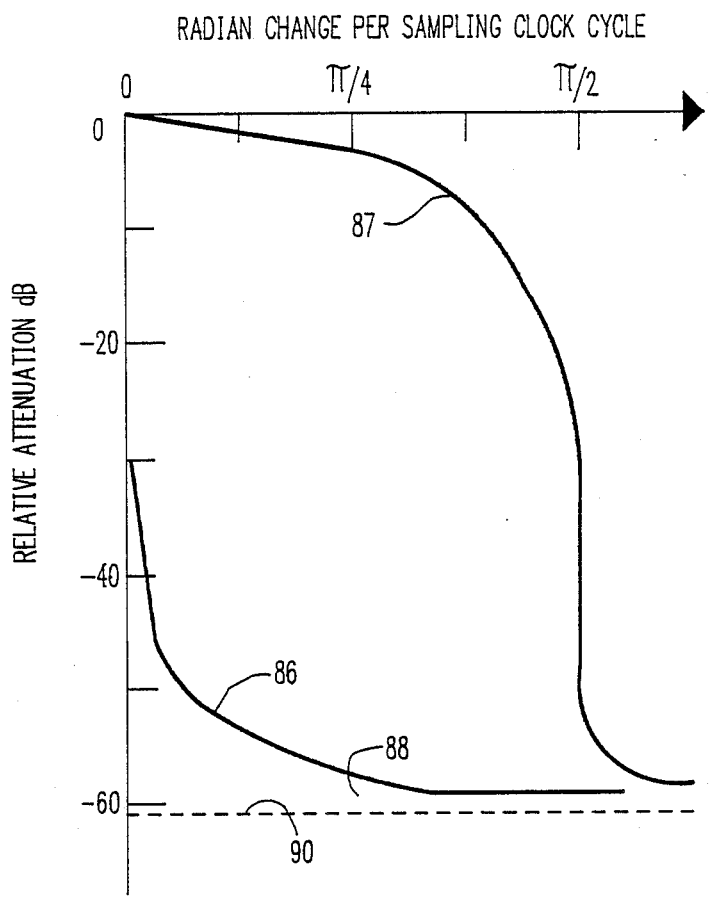
FIG. 3 is a performance diagram of signal verses noise in an exemplary DRFM operating in accordance with the teachings of the present invention.

FIG. 3 illustrates the calculated relationship between the two most important frequency components of the net signal at point 38 in FIG. 1, namely, the image 86 and the desired component 87. The power drop-off of the image 86 in comparison with the desired component of the RF 87 is clearly illustrated. Spurs occur in the spur region 88 below the image 86 and near the noise floor 90. It can be seen from FIG. 3 that for a given phase shift $\theta$ per sampling clock period the desired component of the RF signal output 87 is significantly higher than the image signal 86 and the spur region 88. The calculations to make FIG. 3 were based on a ratio for the DRFM bandwidth to the receiver bandwidth of $2.5 \times 10^6$ (e.g., 500 mhz and 200 hertz). In the invention, occur in the spur region 88 far below the all the spurs signal level 87. FIG. 3 shows that a $\theta$ of about $\pi/4$ is a preferred or optimum value. Thus, the present invention is effective to virtually eliminate spurs from the DRFM.

What is claimed is:

1. A modulated digital radio frequency memory suitable for use as a coherent radio frequency memory in a military electronic countermeasure system, said memory including an RF local oscillator for producing local oscillator signal;

means for modulating a local oscillator signal with a modulating analog waveform and optionally containing discrete digital levels in a pattern for ease of replication;

a first mixer for converting an RF input signal and modulated local oscillator signal into an intermediate frequency signal representative of both the RF input and the modulated LO;

an analog-to-digital converter for converting the intermediate frequency signal into digital values;

digital memory means for storing the digital values in accordance with the occurrence of the RF input signal for later retrieval;

digital-to-analog converter means for converting the retrieved digital values into an analog signal;

an intermediate frequency filter for filtering the analog signal;

a second mixer for converting the filtered analog signal and said modulated local oscillator signal into a demodulated RF output signal; and means for controlling the modulating and memory means such that the pattern of the modulation of the local oscillator signal which is applied to the second mixer when specific digital values are being retrieved and converted from the digital memory means is reproduced identical to the pattern of the modulation which is in the local oscillator signal applied to the first mixer when the specific digital values are converted and stored in the digital memory means so that the output RF signal resembles the input RF signal in form and duration, said means for controlling the modulating and memory means including a waveform generator comprising a digital ROM having stored therein an addressably retrievable string of a pseudo randomly arranged sequence of one bit words, any successive number of such words retrieved from the ROM in a bit pattern, digitally representing the pattern of the modulating analog waveform to be reproduced;

a resettable address counter coupled to the ROM for addressably calling the bit pattern beginning at any random starting address chosen in accordance with the occurrence of an input signal pulse, and setting the counter to that random address with a load pulse;

the address counter being enabled thereafter to call the bit pattern during a time interval corresponding to the RF input pulse width;

said address counter being resettable to the starting address upon the occurrence of a reset pulse occurring after programmed storage length of the converted intermediate frequency signal in the digital memory means;

said address counter being enabled to call the bit pattern during a subsequent time interval corresponding to the occurrence of the demodulation of the RF output.

2. A modulated digital radio frequency memory (DRFM) for coherently storing an RF input signal and producing at a later time an RF output signal which is a replica of the RF input, said DRFM suitable for use in a military electronic countermeasure system, comprising:

an RF oscillator for producing a local oscillator signal;

means for modulating the local oscillator signal with a modulating analog waveform in a pattern;

a first mixer for converting said RF input signal and the modulated local oscillator signal into an intermediate frequency (IF) signal;

an analog-to-digital converter for converting the IF signal into digital values;

digital memory means for storing said digital values for later retrieval;

a digital-to-analog converter for converting retrieved digital values into an analog signal;

a second mixer for the analog signal and the modulated local oscillator signal for producing into an RF output signal which is a delayed replica of the RF input signal; and means for controlling the modulating and memory means such that the pattern of the modulation on the local oscillator signal which is applied to the second mixer when specific digital values are being retrieved from the digital memory means is identical to the pattern of modulation which was on the local oscillator signal applied to the first mixer when the specific digital values were converted and stored in the digital memory means so that the RF output signal resembles the input RF signal in form and duration, said means for controlling comprising a digital ROM having stored therein addressably retrievable words in a pseudo random sequence at various addresses, said ROM for producing selected words in a bit pattern corresponding to the address thereof;

a resettable address counter for producing an count address output and being coupled to the ROM for addressably calling the addressably retrievable words from the ROM in accordance with the count address;

a latch means coupled to the address counter for storing the count address upon the occurrence of a load pulse, said stored count address corresponding to a starting address for the address counter;

said address counter responsive to the latch and being enabled by an enable pulse to count from the starting address for a first time interval corresponding to the occurrence of the input RF and being resettable to the starting address stored in the latch by a reset pulse and further being enabled by the enable pulse to again count from the starting address reset therein during a second time interval corresponding to the production of the RF output so that during the first and second time intervals the address counter addressably retrieve the same words from the ROM and the ROM produces the same bit pattern to thereby reproduce the modulation pattern on the local oscillator signal.

3. The digital radio frequency memory of claim 2, wherein the means for controlling the modulating and memory means phase modulates the signal from the local oscillator.

4. The digital radio frequency memory of claim 2, wherein the means for controlling the modulating and memory means modulates the local oscillator signal with a pseudo random waveform in accordance with the addressably retrievable words from the ROM.

5. The digital radio frequency memory of claim 4, wherein the pseudo random waveform contains discrete digital levels.

6. The digital radio frequency memory of claim 5, wherein ROM stores a string of addressably retrievable pseudo random one bit words and the discrete digital levels of the pseudo random waveform correspond to the bits addressably retrieved from the ROM.

7. The digital radio frequency memory of claim 2, wherein the means for controlling and modulating the memory means frequency modulates the local oscillator.

8. The digital radio frequency memory of claim 2, further including an AC noise source and means for mixing the AC noise source with the modulating waveform prior to application of the modulated waveform to the local oscillator signal.

9. A method for retrievably storing an RF signal in a single channel digital RF memory, including the steps of:

applying a modulated local oscillator signal and an input RF signal to a first mixer to produce an intermediate frequency (IF) signal;

converting the input IF signal into digital values;

storing the digital values in a digital memory;

retrieving the digital values from the digital memory;

converting the retrieved digital values to an output intermediate frequency (IF) signal;

applying a modulated local oscillator signal and the output IF signal to a second mixer to produce an RF output corresponding to the RF input;

controlling the modulation on the local oscillator signal applied to the first and second mixers such that the modulation is identical when the stored and retrieved digital values correspond to the same RF signal including storing addressably retrievable words in a digital ROM;

producing count addresses from an addressable counter for application to the ROM to addressably retrieve selected words therein during the occurrence of the RF input signal;

storing the output of the address counter beginning at a starting address corresponding to the beginning of the RF input and resetting the counter to the starting address at a time corresponding to the retrieval of the RF signal so that the same words are 14 produced by the ROM each time;

converting the output of the ROM to an analog signal and applying the analog signal to the local oscillator signal for modulating the RF input signal and the IF output signal with identical patterns.

10. The method for storing an RF signal according to claim 9, including the step of providing analog noise and mixing the noise with the converted analog output of the ROM for application to the local oscillator signal.

11. The method for storing and RF signal according to claim 9, further including broadening the instantaneous bandwidth to an equivalent equal to a dual channel DRFM.

* * * * *